May 14, 1940.  W. O. BECHMAN ET AL  2,200,766

WHEEL

Filed April 28, 1939

Inventor
W. O. Bechman
A. A. Holmberg
By Paul O. Pippel
Atty.

Patented May 14, 1940

REISSUED
OCT 14 1941

2,200,766

UNITED STATES PATENT OFFICE 2,200,766

WHEEL

William O. Bechman and Rudolph A. Holmberg, Chicago, Ill., assignors to International Harvester Company, a corporation of New Jersey Application April 28, 1939, Serial No. 270,615

4 Claims. (Cl. 301—18)

This invention relates to a wheel of the type adapted to carry a demountable rim and more particularly to an improved rim clamping means for the wheel.

Various types of wheels are provided in which the peripheral portion is of uniform diameter and is adapted to carry a demountable rim which in turn carries a pneumatic tire. In order to mount the rim securely on the wheel, a plurality of pairs of rim clamps or lugs must be provided, respective clamps of each pair being secured in alinement at opposite sides of the wheel. In the more simple wheel types, each pair of clamps is held in place by a single bolt. Disadvantages are found in this construction, however, in that removal of one of the clamps of a pair necessarily results in displacement or removal of its member clamp. The total result is that in mounting and demounting the rim a considerable number of parts must be handled.

In other instances, another wheel type is formed with integral lug portions at one face of the wheel serving to engage one side of the rim. In this type of construction, the rim may be removed from only one side of the wheel; viz., from that side to which the removable clamps are secured.

The principal object of the present invention is to provide an improved rim clamping means for a wheel having a demountable tire-carrying rim thereon in which the rim may be removed from either side with a minimum of time and effort.

An important object is to provide the rim clamping means in the form of clamps or lugs which are separate from the wheel, yet one of which may be normally fixed to the wheel while the other is removable from the wheel independently of the other to permit removal of the rim.

Another important object is to provide a rim clamping means in which a pair of rim clamps may be held by the same securing means.

Another object, specifically, is to provide a pair of rim clamps which may be securely held in place on the wheel by a single bolt, in which a nut is carried by the bolt for holding one of the clamps normally fixed with respect to the wheel and in which the other clamp is adapted to be carried by the bolt outside the nut in rim-engaging position.

Another object is to provide one of the clamps with a recessed portion for accommodating the nut that holds the other clamp in position.

Still another object is to provide a pair of clamps which are identical in form and which may be readily formed from the same stock and which, when finally shaped, serve to accommodate certain portions of the securing means, and which may be disposed in reversed positions on the wheel to support the tire-carrying rim.

Briefly and specifically, these and other important objects are achieved in one preferred form of the invention wherein the improved clamping means is utilized in conjunction with a wheel having a peripheral portion of uniform diameter. The improved means may be just as advantageously used in conjunction with wheels of the spoke-end type. The clamps are substantially identical and are adapted to be carried respectively at opposite faces of the wheel in reversed positions with the tire-carrying rim secured therebetween. Each of the clamps has a recessed portion formed by an extending portion, the recessed portion of one clamp serving to accommodate the head of a bolt which is passed through the wheel and the clamps for securing the same together, the recess in the other clamp accommodating a nut carried by the bolt against a wheel face to secure the opposite clamp in position independently of the other clamp. The extending portion on the first clamp serves to engage one side of the tire-carrying rim and the corresponding portion on the other clamp serves to engage the opposite wheel face for spacing the clamp from the rim. The clamps being thus disposed on the wheel in reversed position, a second nut is threaded on the end of the bolt for securing the latter clamp to the wheel. This arrangement of clamps or lugs permits removal of the rim from the wheel by the simple procedure of removing the lugs at one side which are removable independently of the lugs or clamps at the other side.

A more complete understanding of the objects and desirable features of the invention may be had from the accompanying sheet of drawings, in which.

Figure 1:
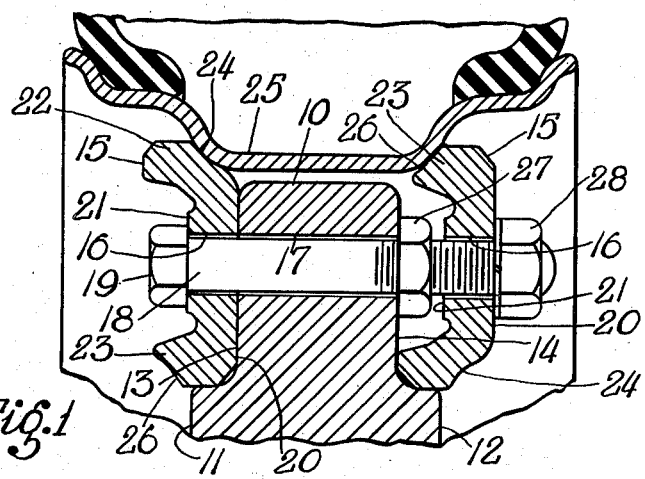
Figures 1 and 2 are, respectively, a vertical sectional view and an elevational view of the improved rim clamping means shown in conjunction with a wheel and rim.
Figure 2:
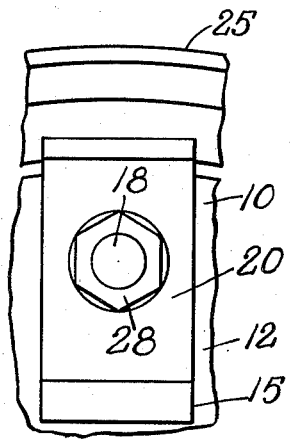

In the preferred form of the invention illustrated, a wheel of the type having a periphery of uniform diameter is shown at 10, the wheel having opposite faces 11 and 12. The peripheral portion of the wheel is provided at each of the faces 11 and 12 with lug or clamp receiving seats 13 and 14, respectively. In the event that a wheel of the spoke-end type is utilized, the spoke ends, as is well known to those skilled in the art, serve to provide the lug-receiving seats corresponding to the seats 13 and 14 herein.

While the drawing illustrates only one improved clamping means, it will be understood that the wheel is provided with a plurality of the same circumferentially spaced about the wheel. Each clamping means consists of a pair of identical clamping members or lugs 15 formed with central openings 16. When the members are disposed in position on the wheel, the openings 16 are alined with an opening 17 formed in the wheel near its periphery and a bolt 18 is passed through these openings, the bolt serving as part of the novel securing means and having a head 19 which engages one of the lugs or clamps 15.

The lugs 15 are substantially identical and may be easily and readily formed from a length of the same stock and are so formed as to be reversible in position from one side of the wheel to the other. Each lug includes a body portion which at one side has a flat face 20 and at the other side a smaller flat face 21. The face 21 comprises the inner portion of a recessed part of the lug which is formed by an extending portion 22 at one side and a smaller extending portion 23 at the other side. The extending portion 22 is provided at its edge adjacent the flat face 20 with a curved surface 24 which serves in one position of the lug to engage the center well of a tire-carrying rim 25, as best shown in Figure 1. The surface could be flat if desired. The extending portion 23 is formed along its edge with a curved surface 26 which serves in a reversed position of the lug to engage the center well of the rim 25.

Figure 3:
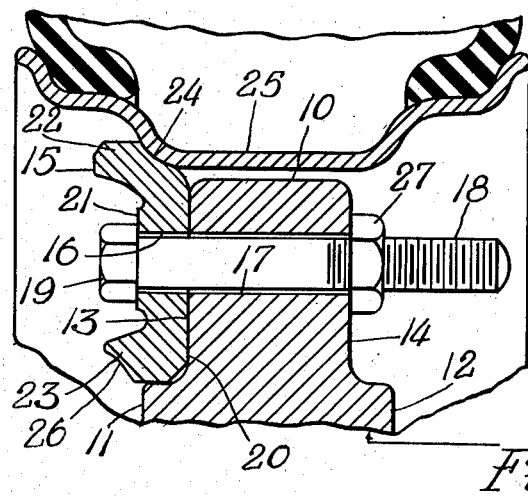
Figure 3 is a sectional view similar to Figure 1, showing the manner in which one clamp may be removed independently of the other; and, Figure 4 is a perspective view of one of the clamps or lugs.
Figure 4:
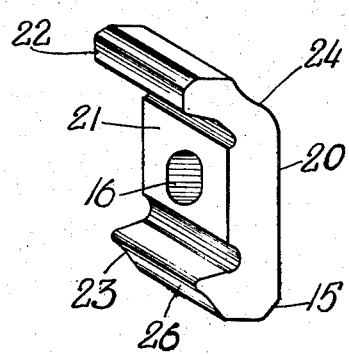

As best shown in Figure 1, one of the lugs 15 is arranged on the wheel 10 with its flat face 20 fitting the lug seat 13, the recess formed by the portions 21, 22, and 23 accommodating the head 19 of the bolt 18. The other lug 15 is arranged at the other side of the wheel in a reversed position, with the extending portion 22 fitting the lug seat 14 and engaging the side of the wheel at the wheel face 12. The curved surface 26 on the portion 23 engages the other side of the center well of the tire-carrying rim 25. A nut 27 is carried by the bolt 18 and abuts the face of the wheel at the lug seat 14, thus securely holding the clamp 15 at the wheel face 11 securely in position or normally fixed independently of the clamp 15 at the other wheel face 12. The recess formed in the latter lug accommodates the nut 27 and because of the extended portion 22, the lug is spaced from the wheel at the seat 14. By means of the cooperation between the extended portion 22 of this latter lug or clamp and the lower portion of the seat 14, a proper clamping action is obtained by which the rim 25 is securely carried on the wheel between the lugs 15. A second nut 28 is threaded on the bolt 18 outside the lug 15 at the wheel face 12 and serves to removably secure the lug or clamp in position independently of the other lug 15. The manner of removing one lug from the wheel independently of the other is clearly illustrated in Figure 3.

By means of the improved clamping means, the rim 25 is adapted to be mounted on and demounted from the wheel quickly and easily and with the handling of a minimum number of parts. Since one lug of each pair is securely held in position on the wheel, it is necessary only to remove the other lug of a pair in order to remove the rim from the wheel. It is not necessary, in removing the tire freely from the wheel, to remove all lugs at one side; removing some and loosening others will permit free removal of the tire. This improvement is especially important in wheels of the type utilized in agricultural tractors having adjustable treads in which it is often necessary and desirable to change the positions of the wheels on the tractor axles. The wheel having the most advantages for this purpose is a wheel of the "convex" type, that is, wherein the plane of the rim-carrying portion is axially off-set with respect to the plane of the hub. As is well known to those skilled in the art, this type of wheel may be reversed on the axle, thus increasing the number of tread positions obtainable. The improved rim clamping means plays an important part in the use of this type of wheel, since both lugs may be removed from the wheel and remounted thereon in a manner permitting removal of the rim from the wheel face opposite to that illustrated in the drawing. Since the lugs are identical, it is not necessary that care be taken as to the manner of remounting them in position. This feature is also important in replacing the lugs or clamps, should they become broken or lost. Of particularly great importance is the fact that since the lugs are identical, they may be readily and economically manufactured from lengths of the same stock by a simple shearing operation.

Only a preferred form of the rim clamping means constituting the subject-matter of the present invention has been illustrated but it will be appreciated that numerous modifications and alterations may be made in the form and use thereof without departing from the spirit and scope of the invention as defined in the appended claims.

What is claimed is:

1. A tire and wheel assembly comprising a wheel, a demountable rim carried thereon, a rim-supporting clamp member disposed at one side of the wheel to engage one side of the rim, a bolt passed through the clamp member and the wheel, a nut on the bolt at the other side of the wheel for securing the clamp and bolt, and a second clamp member at the other side of the wheel engaging the other side of the rim, said clamp being secured in position by the aforesaid bolt and being formed with a recess accommodating the aforesaid nut.

2. A rim clamping means for a wheel assembly including a wheel and a demountable rim, comprising a rim-supporting clamp disposed at one side of the wheel to engage one side of the rim, said clamp having a recess formed therein facing away from the plane of the wheel, a bolt passed through said clamp and the wheel and having a head accommodated by said recess, a nut at the other side of the wheel securing the bolt and clamp, and an identical rim-supporting clamp secured by the aforesaid bolt at the other side of the wheel and engaging the other side of the rim, said clamp being reversed in position with respect to the first clamp, its recess accommodating the aforesaid nut.

3. A rim clamping means for a wheel assembly including a wheel and a demountable rim, comprising a pair of identical rim-supporting clamp members disposed in reversed positions respectively at opposite sides of the wheel and engaging opposite sides of the rim, a single securing bolt passed through the clamps and wheel, each clamp including an extended portion, on one clamp serving to support the rim, and on the other clamp serving to space a portion of said clamp from the wheel, a nut carried on the bolt within the space for securing one clamp to the wheel independently of the other, and a second nut carried on the bolt for securing the other clamp in position.

4. A rim clamping means for a wheel assembly including a wheel and a demountable rim, comprising a pair of identical rim-supporting clamp members disposed in reversed positions respectively at opposite sides of the wheel and engaging opposite sides of the rim, a headed bolt passed through the clamps and the wheel, each clamp being formed with a recess bounded by an extending portion, the recess in one clamp accommodating the bolt head and the extending portion engaging the rim, a nut carried on the bolt between the wheel and the other clamp for securing the first clamp to the wheel, the recess in said other clamp accommodating said nut and the extending portion engaging the wheel for spacing a portion of the clamp from the wheel, and a second nut on the bolt securing said clamp in position independently of the other.

WILLIAM O. BECHMAN.
RUDOLPH A. HOLMBERG.